United States Patent [19]

Sanai

[11] Patent Number: 4,933,814
[45] Date of Patent: Jun. 12, 1990

[54] PLANAR LUMINESCENT DEVICE

[75] Inventor: Yukiharu Sanai, Hyogo, Japan

[73] Assignee: Mitsubishi Denki Kabushiki Kaisha, Tokyo, Japan

[21] Appl. No.: 299,660

[22] Filed: Jan. 23, 1989

[30] Foreign Application Priority Data

May 26, 1988 [JP] Japan ................. 63-130563

[51] Int. Cl.⁵ .............................. F21V 8/00
[52] U.S. Cl. ........................ 362/26; 362/29; 362/31; 350/345
[58] Field of Search ............ 362/26, 27, 29, 31; 350/345

[56] References Cited

U.S. PATENT DOCUMENTS

| 2,354,367 | 7/1944 | Ford | 362/26 |
| 2,594,459 | 4/1952 | Larson, Jr. | 362/31 |
| 3,023,304 | 2/1962 | Peterson | 362/31 |
| 4,791,540 | 12/1988 | Dreyer, Jr. et al. | 362/31 |

FOREIGN PATENT DOCUMENTS 62-69281  4/1987  Japan .

Primary Examiner—Ira S. Lazarus
Assistant Examiner—Richard R. Cole
Attorney, Agent, or Firm—Burns, Doane, Swecker & Mathis

[57] ABSTRACT

A planar luminescent device comprising a light source whose luminance distribution exhibits varied luminous intensity from a high level to a low level, a light transmitting plate having a light transmitting property and shaped in a planar form, and a reflecting frame for enclosing the light source in cooperation with the surface of a printed board to which the light source is attached and the end face of the light transmitting plate and also holding the light transmitting plate having its end faces on which the light from the light source does not impinge in close contact therewith, in which a portion on an end face of the light transmitting plate is disposed closest to the position where the luminance of the light source is at the low level and incident light on the end face is adapted to be scatteringly reflected by a scattering reflection layer disposed on the back face of the light transmitting plate and radiated from the surface of the same.

8 Claims, 2 Drawing Sheets

PLANAR LUMINESCENT DEVICE

BACKGROUND OF THE INVENTION

1. Field of the Invention

The present invention relates to a planar luminescent device used, for example, in backside illumination for a liquid crystal display panel.

2. Description of the Prior Art

As a prior art device of this type, one for example disclosed in Japanese Laid-open Utility Model Publication No. 62-69281 is known. This device is, as shown in FIG. 1, composed of a light transmitting plate 1, incandescent lamps 2a, 2b disposed on an end face of the light transmitting plate 1, a reflecting frame 3 enclosing the light transmitting plate 1 and the incandescent lamps 2a, 2b, and so on, in which emitted light from the incandescent lamps 2a, 2b is introduced into the light transmitting plate 1, scatteringly reflected by a scattering reflection layer (not shown) disposed on the back face of the light transmitting plate 1, and radiated from the surface of the light transmitting plate 1, whereby a liquid crystal display panel (not shown) or the like disposed in front of the light transmitting plate 1 is illuminated.

In such a prior art device, when for example an incandescent lamp 2a is disposed in such a way that the longitudinal direction of its filament 2aa lies in parallel with the end face 1a of the light transmitting plate 1, luminance distribution of the incandescent lamp 2a becomes as indicated by dotted line A in the drawing (it is thereby shown that light intensity is equal along the dotted line). Namely, the quantity of light incident on the end face 1a of the light transmitting plate 1 is larger at the portion close to the incandescent lamp 2a and smaller at the portion apart from it. As a result, the distribution of the quantity of the incident light becomes as indicated by dotted line B (it is thereby shown that light intensity is equal along the dotted line). Then, the radiated light from the surface of the light transmitting plate 1 becomes intense at the portion closer to the incandescent lamp 2a and it becomes weak at the portion away from the incandescent lamp 2a. Thus, there has been a problem that uniform planar luminous intensity cannot be obtained.

SUMMARY OF THE INVENTION

The present invention was made to overcome the above mentioned difficulty. Accordingly, an object of the present invention is to provide a planar luminescent device radiating uniform intensity of light from every portion on its surface.

The planar luminescent device according to the present invention has employed a light source whose luminance distribution exhibits varied luminous intensity from a high level to a low level and it has been arranged such that a portion on an end face of the light transmitting plate is disposed closest to the position where the luminance of the light source is at the low level.

According to the present invention, the difference is made small between the quantity of light from the above described light source incident on the portion of the end face disposed closest to the position where luminance of the light source is low and that incident on other portions of the end face.

BRIEF DESCRIPTION OF THE DRAWINGS

FIG. 1 and FIG. 2 show a prior art planar luminescent device, of which FIG. 1 is a perspective view and FIG. 2 is a plan view showing luminous intensity distribution of a light source; and FIG. 3 to FIG. 6 are for showing a planar luminescent device according to an embodiment of the present invention, of which FIG. 3 is a front view of the planar luminescent device and also a sectional view taken along line III—III of FIG. 4, FIG. 4 is a sectional view taken along line IV—IV of FIG. 3, FIG. 5 is a detail drawing of a main portion of FIG. 3, and FIG. 6 is a plan view showing luminous intensity distribution of a light source.

DETAILED DESCRIPTION OF THE PREFERRED EMBODIMENTS

Figure 1:
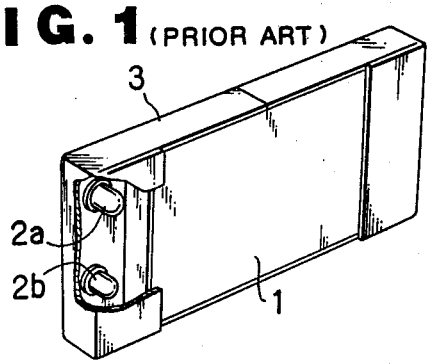
Figure 3:
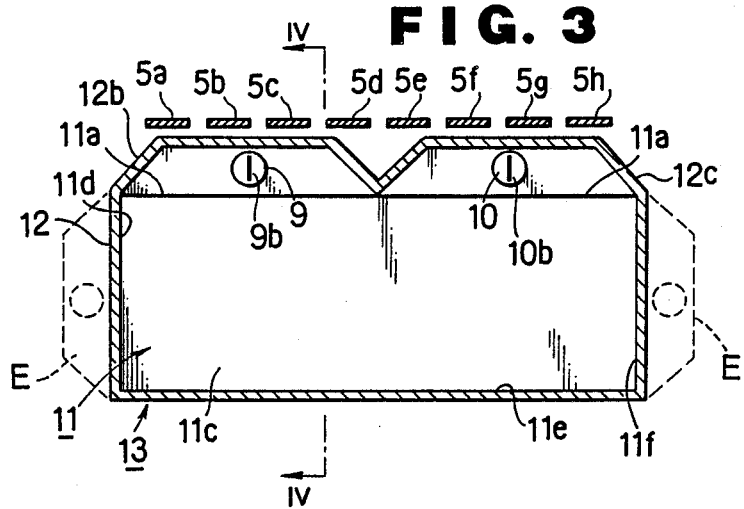
Figure 2:
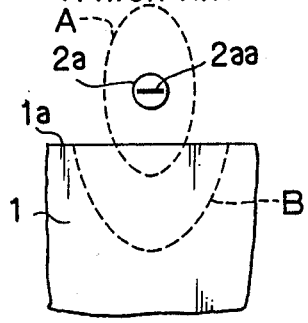
Figure 4:
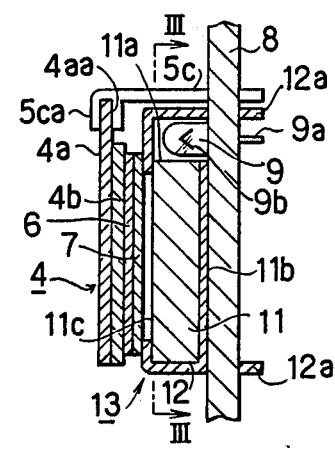
Figure 5:
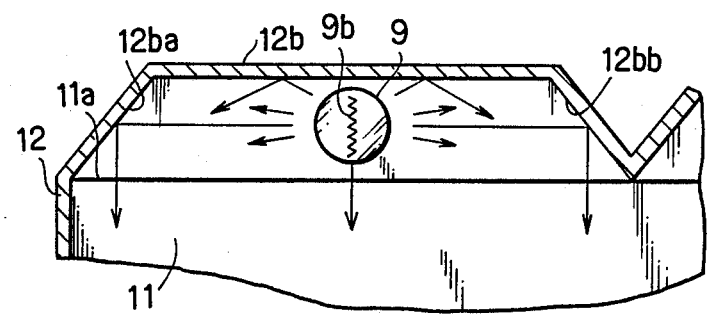

An embodiment of the present invention will be described below with reference to the accompanying drawings. Referring to FIG. 3 to FIG. 5, reference numeral 4 denotes a liquid crystal display panel having a first and a second glass plate 4a, 4b sandwiching a liquid crystal material (not shown) in between, in which display patterns (not shown) are formed by transparent electrodes (not shown) and the display of a predetermined pattern is turned on or off according to a signal from a control circuit (not shown). Reference numeral 4aa denotes a terminal portion which is composed of terminals made up of transparent electrodes disposed on the first glass plate 4a and reference numerals 5a to 5h denote leads which are electrically connected with each of the transparent electrodes of the terminal portion 4aa of the liquid crystal display panel 4, in which a catching portion 5ca of each lead, for example of the lead 5c, is catching hold of its corresponding terminal portion 4aa on the first glass 4a. Reference numeral 6 denotes a translucent dimming plate disposed at the back, on the side of the second glass plate 4b, of the liquid crystal display panel 4 for scattering light to make it uniform, 7 denotes a filter plate being colored and transparent, and disposed at the back of the dimming conditioning plate 6 for coloring light, 8 denotes a printed board with the leads 5a to 5h of the liquid crystal display panel 4 soldered thereto, 9 and 10 denote light sources made up of incandescent lamps whose leads 9a and another are soldered to the printed board 8, and 9b and 10b denote filaments of the light sources 9, 10. The light sources 9, 10 are disposed such that the longitudinal direction of the filaments is in the vertical direction in FIG. 3. Reference numeral 11 denotes a light transmitting plate having a light transmitting property and formed of acrylic resin or the like for receiving light emitted from the light sources 9, 10 at its end face 11a, which extends in the direction from left to right in FIG. 3, and causing the light to be scatteringly reflected by a scattering reflection layer 11b, formed of for example a white paint coating applied to its back face, and radiated from its surface 11c. Reference numeral 12 denotes a reflecting frame formed of aluminum plate, for example, with its leg portions 12a soldered to the printed board 8, enclosing the light sources 9, 10 with its light source enclosing portions 12b, 12c and also holding the light transmitting plate 11 having its end faces 11d, 11e, and 11f in close contact therewith. A planar luminescent device 13 is composed of these light sources 9, 10, light transmitting plate 11, and reflecting frame 12.

Figure 6:
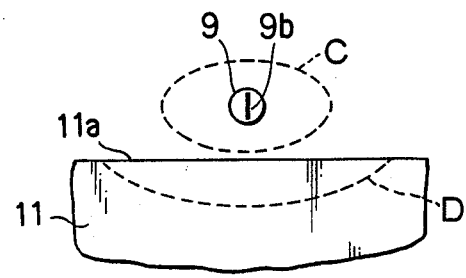

Functions of the present embodiment structured as above will now be described. The light sources 9, 10 are each disposed such that filaments thereof 9b, 10b are arranged perpendicular to the end face 11a of the light transmitting plate 11, and hence, luminance distribution of the light source 9 becomes as indicated by dotted line C in FIG. 6. (it is thereby shown that light intensity is equal along the dotted line). As a result, on the end face 11a of the light transmitting plate 11, the luminance of the light source 9 is weak at the portion close to the light source 9 and the luminance of the light source 9 is intense at the portion apart from the light source 9. Consequently, as indicated by dotted line D (it is thereby shown that light intensity is equal along the dotted line), there is made little difference in light quantity between the light incident on the portion close to the light source 9 and that incident on the portion apart therefrom. The difference can be made still smaller by suitably designing the form of the light source enclosing portion 12b of the reflecting frame 12 as shown in FIG. 5. For example, in the present embodiment, the reflecting faces 12ba and 12bb of the light source enclosing portion 12b are arranged to meet the end face 11a of the light transmitting plate 11 at the portions apart from the light source 9 at an angle of 45° so that the deficiency is quantity of light there is compensated for by introducing more reflected light thereto.

Since, as described above, te quantity of light incident on the end face 11a of the light transmitting plate 11 is made virtually even at any portion thereof, the light incident on the end face 11a will be uniformly propagated through entire body of the light transmitting plate 11 and then scatteringly reflected by the scattering reflection layer 11b and radiated from the surface 11c of the light transmitting plate 11. Thus, luminance distribution on the plate surface 11c shown in FIG. 3 of the light transmitting plate 11 will become virtually even at any portion, and hence, the radiated light from the plate surface 11c will uniformly illuminate the filter plate 7. The radiated light takes on a color after passing through the filter plate 7 and becomes more uniform in luminance distribution by passing through the dimming plate 6, and thereafter, illuminates the liquid crystal display panel 4. In the described manner, the surface 11c of the light transmitting plate 11 becomes a uniform luminescent surface and able to uniformly illuminate the liquid crystal display panel 4.

Since, in the present embodiment, the light sources 9, 10 are disposed at the back of the terminal portion 4aa of the liquid crystal display panel 4, no special space is required for containing the light sources 9, 10 and the light source enclosing portions 12b, 12c (such as, space E as shown in FIG. 3), whereby the area occupied by the device can be made smaller.

Further, since, in the present embodiment, the first glass plate 4a connected with the leads 5a to 5h is disposed on the outer side and the second glass plate 4b is disposed on the side toward the planar luminescent device 13, a considerably wide space is obtained between the light source enclosing portions 12b, 12c of the reflecting frame 12 and the catching portion 5ca for any of the leads 5a to 5h, whereby, when the reflecting frame is conductive, short-circuiting between the leads 5a to 5h through the reflecting frame 12 is made hard to occur.

Although the above embodiment has been described as to its use for illuminating a liquid crystal panel, the same can of course be used for illuminating other types of transparent display panel or simply as an illuminating device.

What is claimed is:

1. A planar luminescent device comprising a light source whose luminance distribution exhibits varied luminous intensity from a high level to a low level and a light transmitting plate having a light transmitting property and shaped in a planar form, wherein a portion on an end face of said light transmitting plate is disposed closest to a position where the luminance of said light source is at the low level and incident light on said end face is adapted to be scatteringly reflected by a scattering reflection layer disposed on a back face of said light transmitting plate and radiated from a surface opposite said back face of said light transmitting plate.

2. A planar luminescent device according to claim 1, wherein said light source is an incandescent lamp having a filament wherein the filament of said incandescent lamp is disposed perpendicular to the end face of said light transmitting plate on which the light from said incandescent lamp impinges.

3. A planar luminescent device according to claim 1, further comprising a reflecting frame for enclosing said light source in cooperation with a surface of a printed board to which said light source is attached and the end face of said light transmitting plate and also holding said light transmitting plate having its end on which the light from said light source does not impinge in close contact therewith.

4. A planar luminescent device according to claim 3, wherein portions of said reflecting frame apart from said light source are meeting at an angle of 45° with the end face of said light transmitting plate on which light reflected by said portions impinges.

5. A planar luminescent device according to claim 4, wherein said planar luminescent device is disposed at a back of a liquid crystal display panel.

6. A planar luminescent device according to claim 5, wherein said light source is disposed at the back of the liquid crystal display panel.

7. A planar luminescent device according to claim 3, wherein said planar luminescent device is disposed at a back of a liquid crystal display panel.

8. A planar luminescent device according to claim 7, wherein said light source is disposed at the back of the liquid crystal display panel.

* * * * *